Jan. 31, 1961 W. P. COUSINO 2,969,714
ADJUSTABLE MOUNTING DEVICE FOR REAR VIEW MIRRORS
Filed May 8, 1957
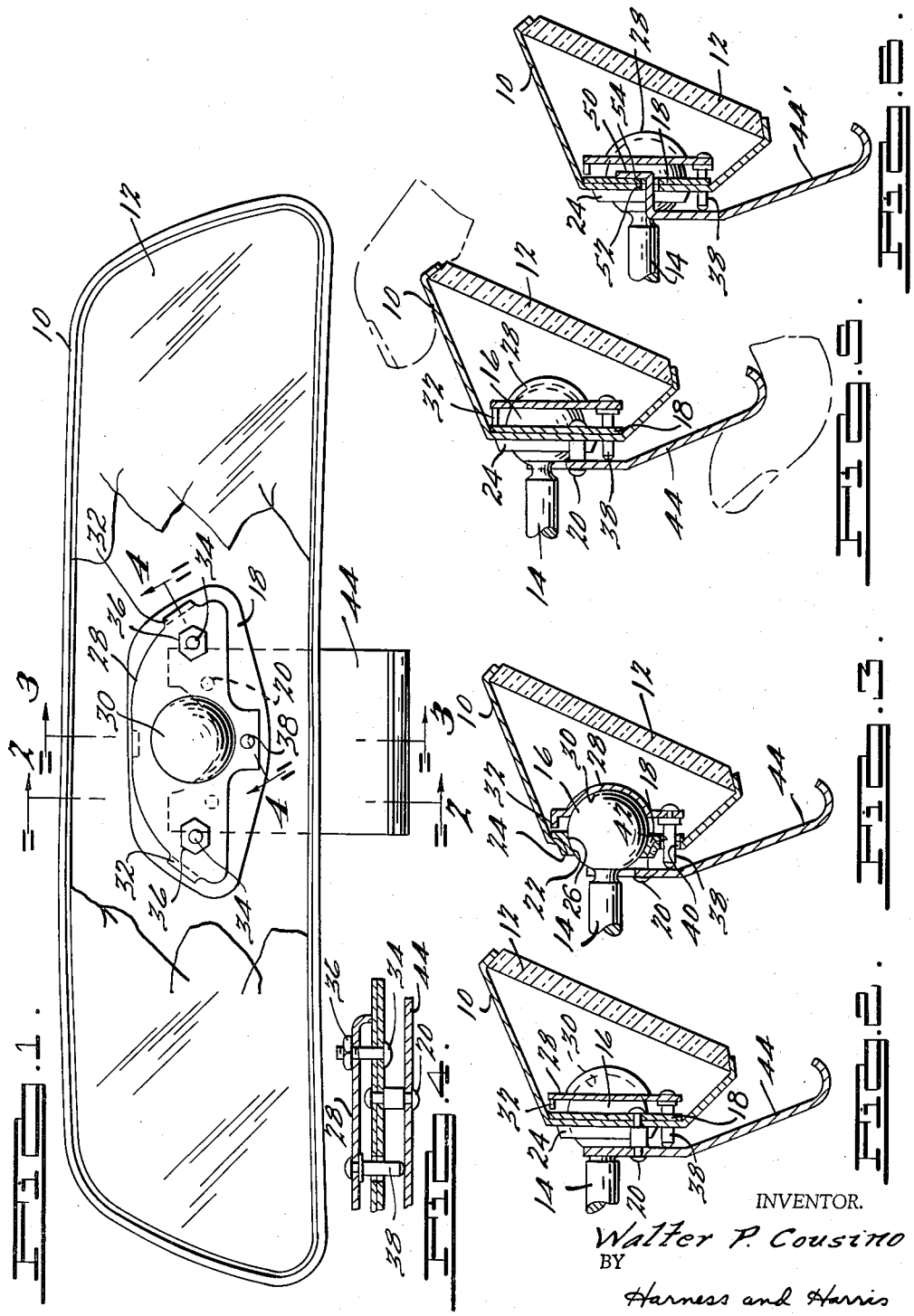
INVENTOR.
Walter P. Cousino
BY
Harness and Harris
ATTORNEYS.

United States Patent Office 2,969,714
Patented Jan. 31, 1961

2,969,714

ADJUSTABLE MOUNTING DEVICE FOR REAR VIEW MIRRORS

Walter P. Cousino, St. Clair Shores, Mich., assignor to Chrysler Corporation, Highland Park, Mich., a corporation of Delaware Filed May 8, 1957, Ser. No. 657,885

4 Claims. (Cl. 88—98)

This invention relates to an adjustable mounting for a movable object, such as an automobile rear view vision mirror, and more particularly to a mounting that is inherently firm in the interval between adjustments.

Many automobile rear view mirrors are supported on a ball and socket joint. If the joint is too loose undesired displacement of the mirror occurs as an incident to vibration or jostling of the mirror by passengers. This is annoying for the mirror is then out of adjustment for the driver and frequent readjustment of the mirror is necessitated. Conversely, if the joint is too stiff difficulty is encountered in adjusting the mirror.

It is a principal object of this invention to provide a mounting device of the ball and socket type which provides a tight fit of the ball and socket joint which, however, may be temporarily manually released to a loose fit by the mere application of finger pressure to facilitate movement of the mirror relative to the mount.

It is an additional object of the invention to provide a deformable resilient element in the mirror mounting device so that temporary deformation of the element will facilitate adjustment of the mirror.

In the drawings:

Fig. 1 is a front elevation, partly broken away, of a mirror incorporating my mounting device;

Fig. 2 is a vertical section taken on the line 2—2 of Fig. 1;

Fig. 3 is a vertical section taken on the line 3—3 of Fig. 1;

Fig. 4 is a partial section taken on the line 4—4 of Fig. 1;

Fig. 5 is a view similar to Fig. 2, but showing the operator's fingers in broken lines and the mounting device in released position; and Fig. 6 is a view similar to Fig. 2, but showing a modified form of the invention.

In the drawings, a metal casing 10 supports a mirror element 12 which has reflective properties and, through means to be described herein, the casing 10 adjustably mounted on a supporting stem 14 which may be secured to the windshield header or instrument panel or other convenient location on an automobile, airplane, train, or the like.

The supporting stem 14 has a ball-shaped end 16 which penetrates the rear of casing 10. A stiffener plate 18 is mounted on the inner surface of casing 10 by means of rivets 20. A stiffener plate 18 is provided with an aperture 22 and the casing 10 is provided with a cooperating aperture 24. The apertures 22 and 24 are in registry to accommodate the projection of stem 14 through the rear of casing 10. In addition, the casing 10 and the stiffener plate 18 are deformed in the vicinity of the respective apertures 22 and 24 to provide a seat 26 for the rear portion of ball 16.

Resilient means are provided to urge the seat or socket 26 against the rear of ball 16. To this end a deformable plate 28 is provided with a concavity 30 which is adapted to register with the front portion of ball 16. Plate 28 is provided with an abutment 32 along its upper edge for engagement with stiffener plate 18 and plate 28 is secured at its lateral extremities to casing 10 by means of a pair of bolts 34 and cooperating nuts 36.

In addition, the plate 28 is provided with a pin 38 in its lower extremity and casing 10 and stiffener plate 18 are respectively provided with aligned apertures 40 and 42 which are penetrated by pin 38. It will be seen that if pin 38 is moved to the right in Fig. 3 of the drawing that deformable plate 28 will be deflected away from the front face of ball 16 and movement of casing 10 relative to ball 16 may then be easily accomplished. The deformable plate 28 is preferably normally urged into tight frictional engagement with ball 16 by means of initial adjustments of nuts 36 on bolts 34.

A lever means is provided to control the position of pin 38 and deformable plate 28. The lever means is accessible from the front of the mirror and includes a depending lever 44 which has its upper portion affixed to casing 10 by suitable fastening means. In Figures 1 through 5 of the drawings the lever 44 is illustrated as secured to casing 10 by itself being secured to the outer portion of the previously mentioned rivets 20. Referring to Fig. 5 it will be seen that if an operator grasps the upper portion of the mirror casing 10 with one finger and grasps the lower end of lever 44 with another finger, such as his thumb, and then squeezes or contracts these fingers toward each other he will deform lever 44 about rivet 20 thereby moving pin 38 to the right in Fig. 3 to the position illustrated in Fig. 5. The deformable plate 28, being of a resilient nature will deform to the position illustrated in Fig. 5 to accommodate this movement of pin 38. The abutment 32 will serve as a reaction point and it is preferred that plate 28 have sufficient lateral width between bolts 34 so that a minimum amount of manual force will be required to effect the desired deflection of plate 28 away from ball 16.

While the mirror is grasped as illustrated in Fig. 5 it will swivel loosely about ball 16 and may be moved to any desired position. When the desired adjustment has been obtained the operator may then remove his hand from the mirror and the resiliency of plate 28 will effect a firm grip on the ball 16 by the cooperating socket components formed in stiffener plate 18 and plate 28. The inherent resiliency of plate 28 will thus force ball 16 against the socket portion of plate 18 to effect a firm grip on the ball.

In Fig. 6 a modification is illustrated in which the depending lever 44' is mounted upon casing 10 in a different manner. In this form of the invention the depending lever 44' has a leg 50 formed thereon which extends through registering openings 52 and 54 in the rear of casing 10 and in the associated stiffener plate 18. The leg 50 abuts stiffener plate 18 and when the mirror is grasped as illustrated in Fig. 5 the leg 50 reacts against the stiffener plate 18 to assure deformation of lever 44' and movement of pin 38 to the right for the purpose previously described herein. In all other respects the device shown in Fig. 5 resembles the device illustrated in Figures 1 through 5 of the drawings.

I claim:

1. In a mirror including a supporting stem having a ball shaped end and a mirror assembly adjustably supported thereon, a mirror element having reflective properties, a casing supporting said mirror element, means on said casing forming a first seat for said ball shaped end of said supporting stem, a plate member forming a cooperating second seat for said ball shaped supporting member, said ball shaped supporting member being retained between said first and second seats, said plate member being secured to said casing on opposite sides of said second seat so that said seats are drawn toward each other to tightly engage said ball shaped member to frictionally retain said casing in a preselected position relative to said supporting stem, and a manually operable member carried by said casing and including means operable to deform said plate member in response to movement of said manually operable member to thereby effect a temporary relative separation of said seat members and a reduction in frictional retention of said ball shaped member between said seats to facilitate adjustment of the mirror casing relative to said supporting stem.

2. In a mirror including a supporting stem having a ball shaped end and a mirror assembly adjustably supported thereon, a mirror having reflective properties, a casing supporting said mirror, means on said casing forming a first seat for said ball shaped end of said supporting stem, a plate member forming a cooperating second seat for said ball shaped supporting member, said ball shaped supporting member being retained between said first and second seats, said plate member being secured to said casing at two points of attachment respectively located on opposite sides of said second seat so that said seats are drawn toward each other to tightly engage said ball shaped member to frictionally retain said casing in a preselected position relative to said supporting stem, a depending manually operable lever carried by said casing, first and second elements disposed on opposite sides of a line connecting said points of attachment, one of said elements comprising an operative connection between said lever and said plate member to effect movement of said plate member in response to movement of said lever and the other of said elements comprising a reaction point between said plate member and said casing to prevent bodily rotation of said plate member about the line connecting said points of attachment to assure deformation of said plate member as an incident to the aforementioned movement of said plate member to thereby effect a temporary relative separation of said seat members and a reduction in frictional retention of said ball shaped member between said seats to facilitate adjustment of the mirror casing relative to said supporting stem.

3. An adjustable mirror assembly comprising a supporting stem terminating in a ball shaped end, a casing having a generally vertical rear wall provided with an opening therethrough and containing a mirror element having reflective properties, a first plate secured on the inner side of the rear wall of said casing and having an opening therethrough aligned with the opening in said rear wall, said stem penetrating said aligned openings and said first plate in the vicinity of its opening providing a seat for the rear of the ball shaped end of said supporting stem, a spring plate having a spherical seat in which the front of the ball shaped end of said supporting stem is seated, said spring plate being secured to said first plate at spaced points of attachment located on opposite sides of said ball shaped end of said supporting stem to effect a frictional retention of said ball shaped end of said supporting stem between said seats, means located above said supporting stem and providing an abutment limiting relative movement of said plates toward each other in the vicinity of the abutment, an operating lever supported by said casing and depending therefrom, pin means interconnecting said lever with a portion of said spring plate at a location below a line connecting the above mentioned spaced points to effect a deformation of said spring plate about said means in response to movement of said lever and a relative separation of said seats to diminish the frictional retention of said ball shaped end by said seats to accommodate adjustment of said casing relative to said supporting stem.

4. Apparatus for adjustably mounting a mirror casing on a ball-type supporting member, said apparatus including means fixed to said casing for movement in unison therewith forming a seat for said ball-type supporting member and a yieldable ball engaging member secured to said casing and having a normal position and a deformed position in which at least a portion of the yieldable ball engaging member is displaced relative to said casing and the above mentioned seat, said yieldable ball engaging member when in its normal position urging said seat and said ball-type suporting member into frictional engagement, said apparatus further including a lever means accessible from the front portion of said casing, said lever means being operatively connected to said yieldable ball engaging member and operable upon said yieldable ball engaging member under the influence of manually applied pressure to move said yieldable ball engaging member in a direction away from said ball-type supporting member to its above mentioned deformed position to thereby unload the frictional engagement of said ball-type supporting member and said seat as long as the above mentioned manual pressure is applied to accommodate adjustment of the position of said mirror casing relative to said ball-type supporting member, said yieldable ball engaging member being adapted to return to its normal position to urge said seat and ball-type supporting member into frictional engagement when the above mentioned manual pressure is discontinued.

References Cited in the file of this patent

UNITED STATES PATENTS

| | | |
|---|---|---|
| 1,290,252 | Lester et al. | Jan. 7, 1919 |
| 1,324,456 | Lutz | Dec. 9, 1919 |
| 1,386,959 | Severance et al. | Aug. 9, 1921 |
| 1,622,114 | Henry | Mar. 22, 1927 |
| 1,883,287 | Zink | Oct. 18, 1932 |
| 1,932,697 | Jankovic | Oct. 31, 1933 |
| 2,089,463 | Ritz-Woller | Aug. 10, 1937 |
| 2,112,656 | Ponce | Mar. 29, 1938 |
| 2,615,368 | Bindley | Oct. 28, 1952 |
| 2,631,498 | Barkley | Mar. 17, 1953 |
| 2,645,158 | Bertell et al. | July 14, 1953 |
| 2,838,979 | Meade | June 17, 1958 |

FOREIGN PATENTS

| | | |
|---|---|---|
| 26,058 | Great Britain | of 1906 |